(12) United States Patent
Silver et al.

(10) Patent No.: US 11,226,626 B1
(45) Date of Patent: *Jan. 18, 2022

(54) DETECTING AND RESPONDING TO PEOPLE DIRECTING TRAFFIC FOR AUTONOMOUS VEHICLES

(71) Applicant: Waymo LLC, Mountain View, CA (US)

(72) Inventors: David Harrison Silver, San Carlos, CA (US); Carl Kershaw, San Francisco, CA (US); Pankaj Chaudhari, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 16/713,568

(22) Filed: Dec. 13, 2019

Related U.S. Application Data

(63) Continuation of application No. 15/798,955, filed on Oct. 31, 2017, now Pat. No. 10,539,959.

(51) Int. Cl.
*G05D 1/00* (2006.01)
*G05D 1/02* (2020.01)

(52) U.S. Cl.
CPC ......... *G05D 1/0088* (2013.01); *G05D 1/0238* (2013.01); *G05D 1/0246* (2013.01); *G05D 1/0255* (2013.01); *G05D 1/0257* (2013.01); *G05D 2201/0213* (2013.01)

(58) Field of Classification Search
CPC ..... G05D 1/0088; G05D 1/0238–0257; G05D 2201/0213
See application file for complete search history.

(56) References Cited

U.S. PATENT DOCUMENTS

| 9,384,402 | B1 | 7/2016 | Furman et al. |
| 9,465,388 | B1 | 10/2016 | Fairfield et al. |
| 9,481,367 | B1 | 11/2016 | Gordon et al. |
| 9,586,585 | B2 | 3/2017 | Delp et al. |
| 9,669,827 | B1 | 6/2017 | Ferguson et al. |
| 10,825,340 | B1 * | 11/2020 | Floyd .................. G05D 1/0214 |
| 2016/0357188 | A1 | 12/2016 | Ansari |
| 2017/0364759 | A1 | 12/2017 | Creusot |

FOREIGN PATENT DOCUMENTS

DE  102017208728 A1 * 11/2018 ............ B60W 50/06

* cited by examiner

*Primary Examiner* — Calvin Cheung
(74) *Attorney, Agent, or Firm* — Botos Churchill IP Law

(57) ABSTRACT

The technology relates to detecting a person directing traffic. For instance, a first vehicle may be controlled in an autonomous driving mode. Sensor data is received from a perception system of the first vehicle, the sensor data identifying a person. Behavior of the person is observed using the sensor data. The observed behavior of the person and the observed behavior of a second vehicle are used to determine a likelihood value indicative of whether the person is directing traffic. The first vehicle is maneuvered in the autonomous driving mode based on the determined likelihood value.

20 Claims, 8 Drawing Sheets

DETECTING AND RESPONDING TO PEOPLE DIRECTING TRAFFIC FOR AUTONOMOUS VEHICLES

CROSS REFERENCE TO RELATED APPLICATIONS

The present application is a continuation of U.S. patent application Ser. No. 15/798,955 filed Oct. 31, 2017, which issued as U.S. Pat. No. 10,539,959 on Jan. 21, 2020, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Robust operation of an autonomous vehicle or a vehicle operating in an autonomous driving mode requires proper response to unexpected circumstances, such as when a person such as a police officer, construction worker, firefighter, or other pedestrian is temporarily directing the flow of traffic. This can occur in construction zones, when a traffic signal light is out or broken, at the site of a traffic incident, or when there is a large event taking place. In such situations, vehicles may be required to stop, proceed, proceed only in a certain direction, turn around, etc. While this may be considered an inconvenience for a human driver, such human drivers are typically able recognize and to respond to these situations easily. While a human driver would not be able to recognize specific commands until very close to the person directing traffic, the human driver would understand conceptually that a person is directing traffic from a much farther distance. Today's computing devices may be able to recognize and respond to human gestures, but in order to do this most effectively, the vehicle's computing devices must first be able to determine that a person is temporarily directing traffic well before the person actually starts actually directing the vehicle.

BRIEF SUMMARY

One aspect of the disclosure provides a method of detecting a person directing traffic. The method includes controlling, by one or more processors, a first vehicle in an autonomous driving mode; receiving, by the one or more processors, sensor data from a perception system of the first vehicle, the sensor data identifying a person; observing, by the one or more processors, behavior of the person using the sensor data; using, by the one or more processors, the observed behavior of the person and the observed behavior of a second vehicle to determine a likelihood value indicative of whether the person is directing traffic; and maneuvering, by the one or more processors, the first vehicle in the autonomous driving mode based on the determined likelihood value.

In one example, the method also includes determining whether the determined likelihood value meets a threshold value, and wherein the maneuvering is further based on the threshold value. In another example, the method also includes, prior to determining the determined likelihood value, determining that the first vehicle is approaching the person. In another example, the method also includes, prior to determining the determined likelihood value, determining that the person is within in a roadway. In another example, observing the behavior of the person includes determining whether the person is moving towards an edge of a roadway. In another example, observing the behavior of the person includes determining whether the person is in a traffic intersection. In another example, observing the behavior of the person includes determining whether the person is wearing a uniform. In another example, observing the behavior of the second vehicle includes determining whether the second vehicle is backing out of a driveway. In another example, observing the behavior of the second vehicle includes observing a responsive behavior of the second vehicle towards the person. In another example, the method also includes identifying at least one contextual cue indicating contextual information, and wherein the at least one contextual cue is used to determine the determined likelihood value. In this example, the at least one contextual cue includes whether the second vehicle is an emergency vehicle. In addition or alternatively, the at least one contextual cue includes whether there are any construction signs within a predetermined distance of the person. In addition or alternatively, the at least one contextual cue includes whether there are any construction markers within a predetermined distance of the person. In addition or alternatively, the at least one contextual cue includes whether there are any flashing traffic signal lights within a predetermined distance of the person.

Another aspect of the disclosure provides a system for detecting a person directing traffic. The system includes one or more processors configured to control a first vehicle in an autonomous driving mode; receive sensor data from a perception system of the first vehicle, the sensor data identifying a person; observe behavior of the person using the sensor data; use the observed behavior of the person and the observed behavior of a second vehicle to determine a likelihood value indicative of whether the person is directing traffic; and maneuver the first vehicle in the autonomous driving mode based on the determined likelihood value.

In one example, the one or more processors are further configured to determine whether the determined likelihood value meets a threshold value, and wherein the maneuvering is further based on the threshold value. In another example, the one or more processors are further configured to prior to determining the determined likelihood value, determine that the first vehicle is approaching the person. In another example, the one or more processors are further configured to determine the determined likelihood value, determining that the person is within in a roadway. In another example, observing the behavior of the person includes determining whether the person is moving towards an edge of a roadway. In another example, the system also includes the first vehicle.

DETAILED DESCRIPTION

Overview

Figure 1:
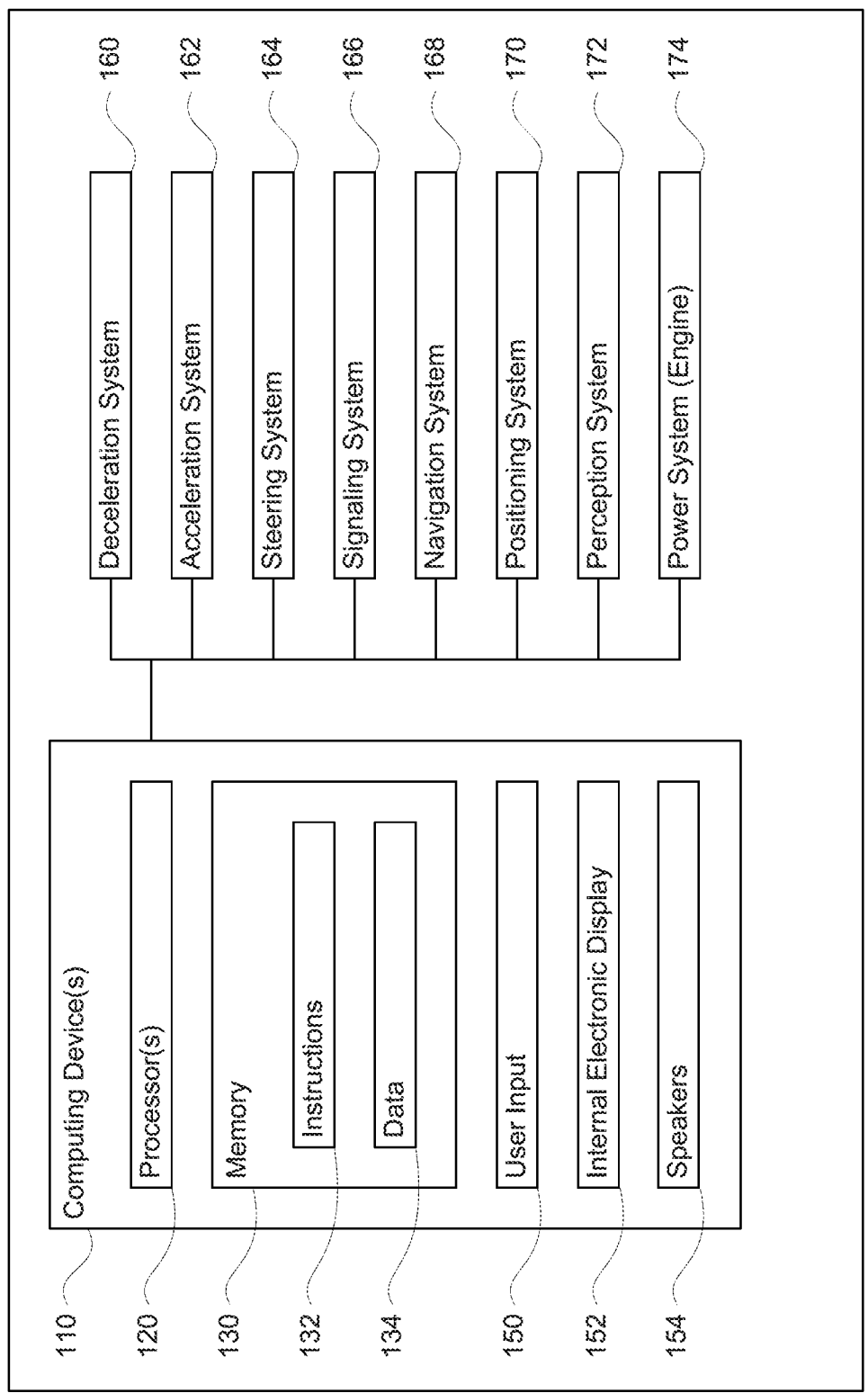
FIG. 1 is a functional diagram of an example vehicle in accordance with aspects of the disclosure.

As noted above, robust operation of an autonomous vehicle or a vehicle operating in an autonomous driving mode requires proper response to unexpected circumstances, such as when a person is directing traffic. As such, the vehicle's computing devices must be able to determine that a person is directing traffic. Ideally, this determination is made at far enough range such that the computing devices, or even a human driver, would not necessarily be able to detect the actual commands from the person. In other words, a human driver may be able to discern that a person such as a police officer, construction worker, firefighter, or other pedestrian is directing traffic at some distance, but would not be able to see the specific commands until the human driver was fairly close to the person. As an example, when on a moderate-high speed road, such as 35 or 45 miles per hour, with a police officer directing traffic through a traffic intersection (or simply, intersection), it is necessary to detect this situation at a far enough range to slow down or stop for the officer and then respond to any commands. This increases the likelihood that the vehicle will respond appropriately without necessarily having to wait until the officer specifically commanded the vehicle to do something.

In order to determine that a person is directing traffic, the vehicle's computing devices may receive information from the vehicle's perception system. This information may identify which objects in the vehicle's environment correspond to people.

At least some of these people may be relevant for further analysis to determine whether those people are directing traffic. For example, from an initial set of all detected people, some people who the vehicle is not currently approaching or who are not actually located in a roadway may be filtered from that set.

The information from the perception system may be used to make observations about any people remaining in the set. In addition to observing the people, the computing devices may also make observations about the behavior of other vehicles in the proximity of the people. The computing devices may also attempt to identify other contextual cues.

Each of these observations and contextual cues may be input into a model which provides a likelihood value for how likely a person is to be directing traffic. The output likelihood value may then be compared to a threshold value. If the likelihood value meets the threshold value, the computing devices may determine that the person is directing traffic. If the likelihood value does not meet the threshold value, the computing devices may continue to make observations and identify contextual cues and provide updated information to the model to determine if the person is directing traffic.

If a person is determined to be directing traffic as discussed above, the computing devices may use a separate gesture and command analysis system to determine how to identify commands relevant to the vehicle and how to respond to those commands. This may include requesting confirmation and classification of the people 'commands' from the gesture and command analysis system. Until a response to the request is received, the computing devices may prevent the vehicle from passing the person or approaching too closely. The computing devices may then control the vehicle according to the information received from the gesture and command analysis system.

The features described herein allow a vehicle's computing devices to determine that a person is directing traffic, and in many cases, before the computing devices are able to actually discern any commands. As noted above increases the likelihood that the vehicle will respond appropriately without necessarily having to wait until the officer specifically commanded the vehicle to do something. Such a detection of a possibility of a person directing traffic also has the advantage of filtering situations for a specific gesture or command detection system, and ensuring such a system more time to process the information. In other words this system can be more computational intensive, have higher latency, have more time to observe more of the people actions, etc.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing devices code on the computing device-readable medium. In that regard, the terms "instructions" and "programs" may be used interchangeably herein. The instructions may be stored in object code format for direct processing by the processor, or in any other computing devices language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing devices having its own processor or central processing unit (CPU), memory, etc. which may interface with the computing devices 110 via a high-bandwidth or other network connection. In some examples, this computing devices may be a user interface computing devices which can communicate with a user's client device. Similarly, the memory may be a hard drive or other storage media located in a housing different from that of computing devices 110. Accordingly, references to a processor or computing devices will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in an external environment of the vehicle), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing devices 110, in actuality, these systems may also be incorporated into computing devices 110, again as an autonomous driving computing system for controlling vehicle 100.

The computing devices 110 may control the direction and speed of the vehicle by controlling various components. By way of example, computing devices 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Figure 2:
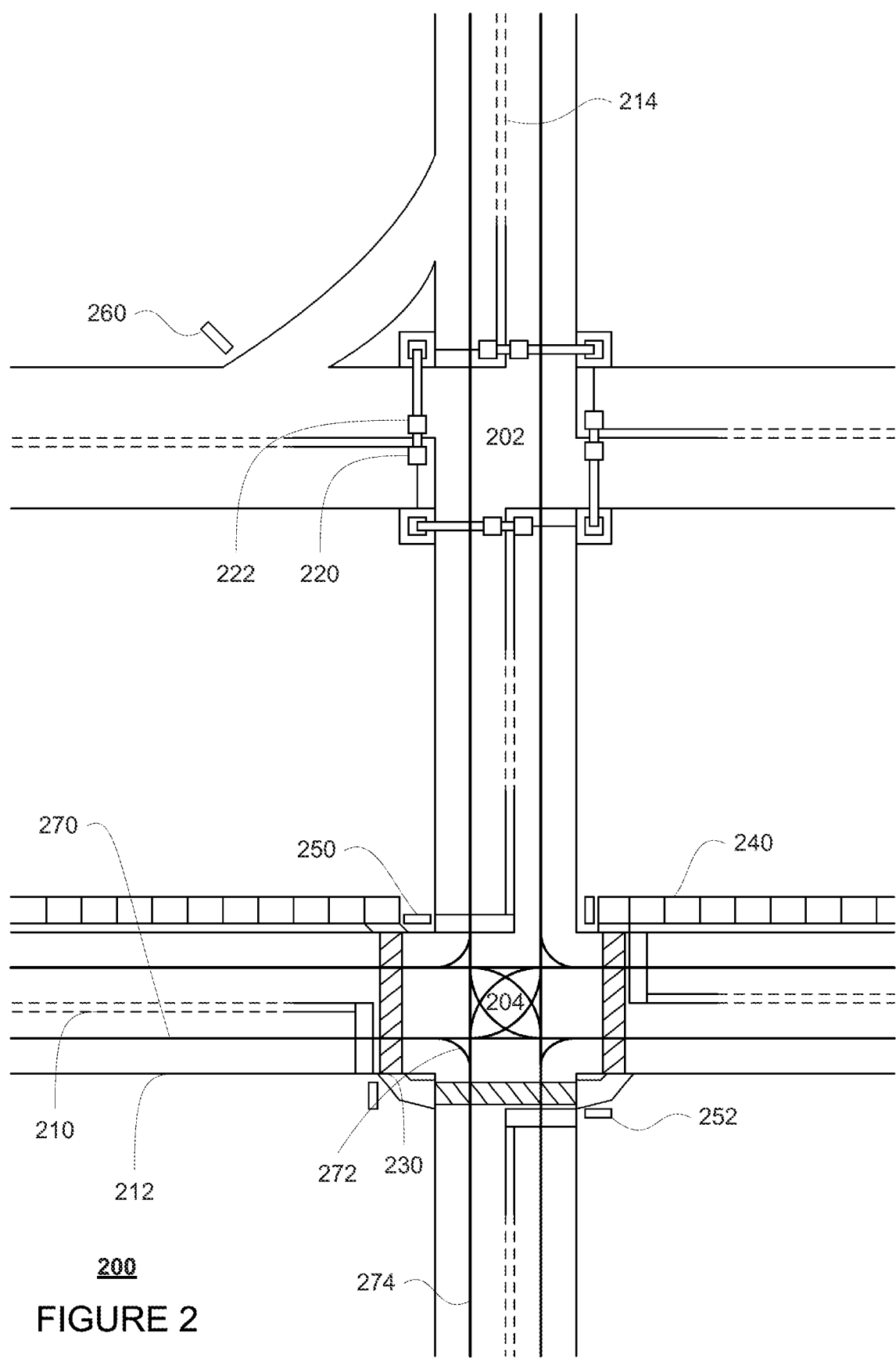
FIG. 2 is an example representation of detailed map information in accordance with aspects of the disclosure.
Figure 3A:
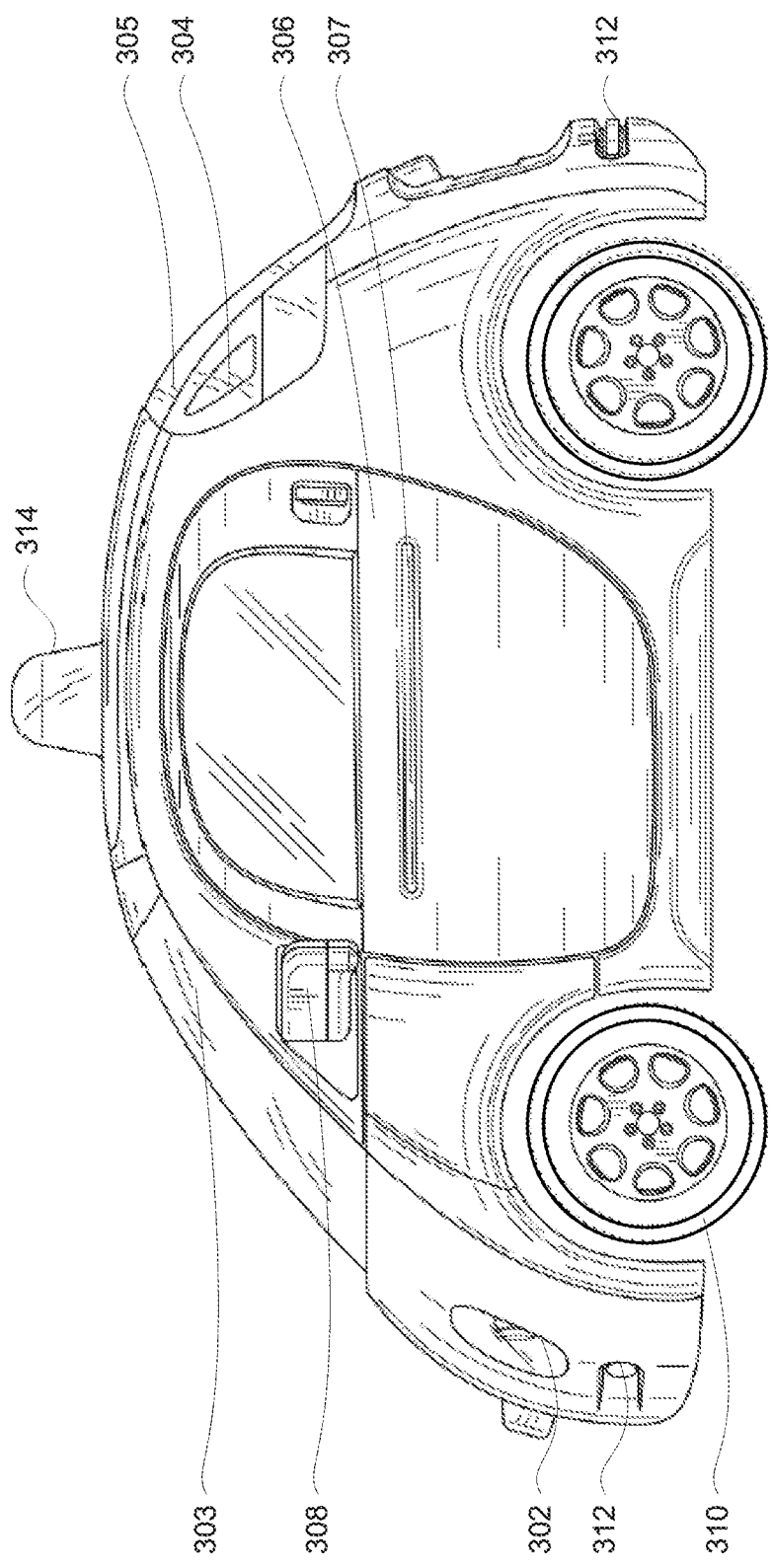
FIGS. 3A-3D are example external views of a vehicle in accordance with aspects of the disclosure.
Figure 3C:
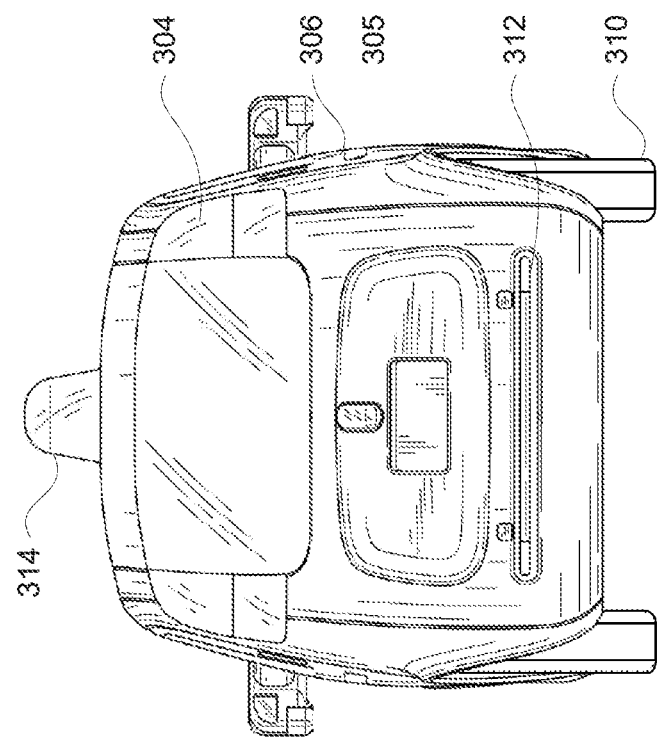
Figure 3B:
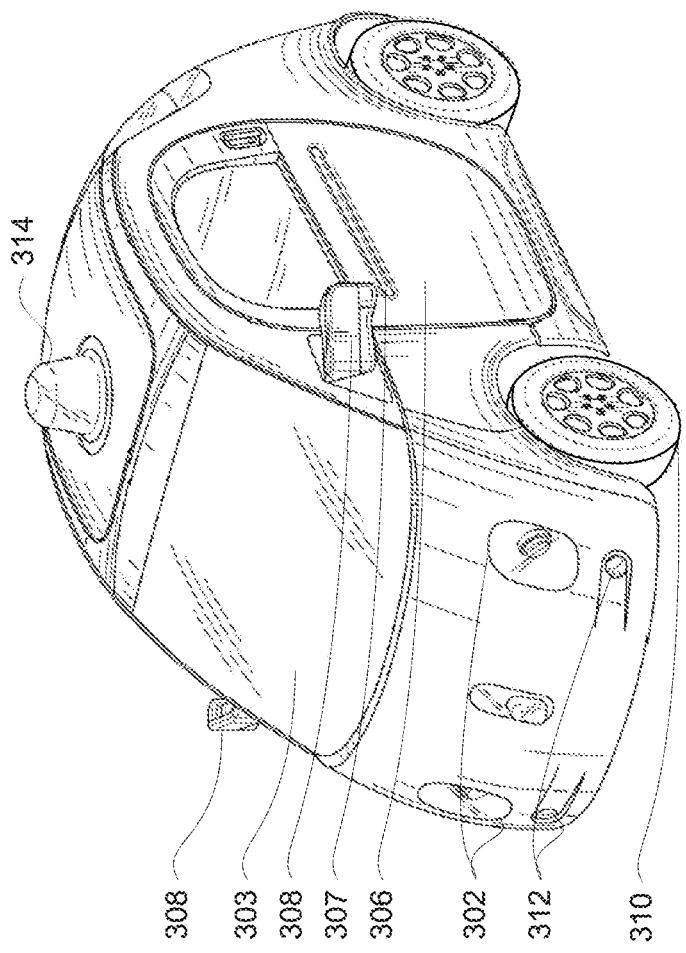
Figure 3D:
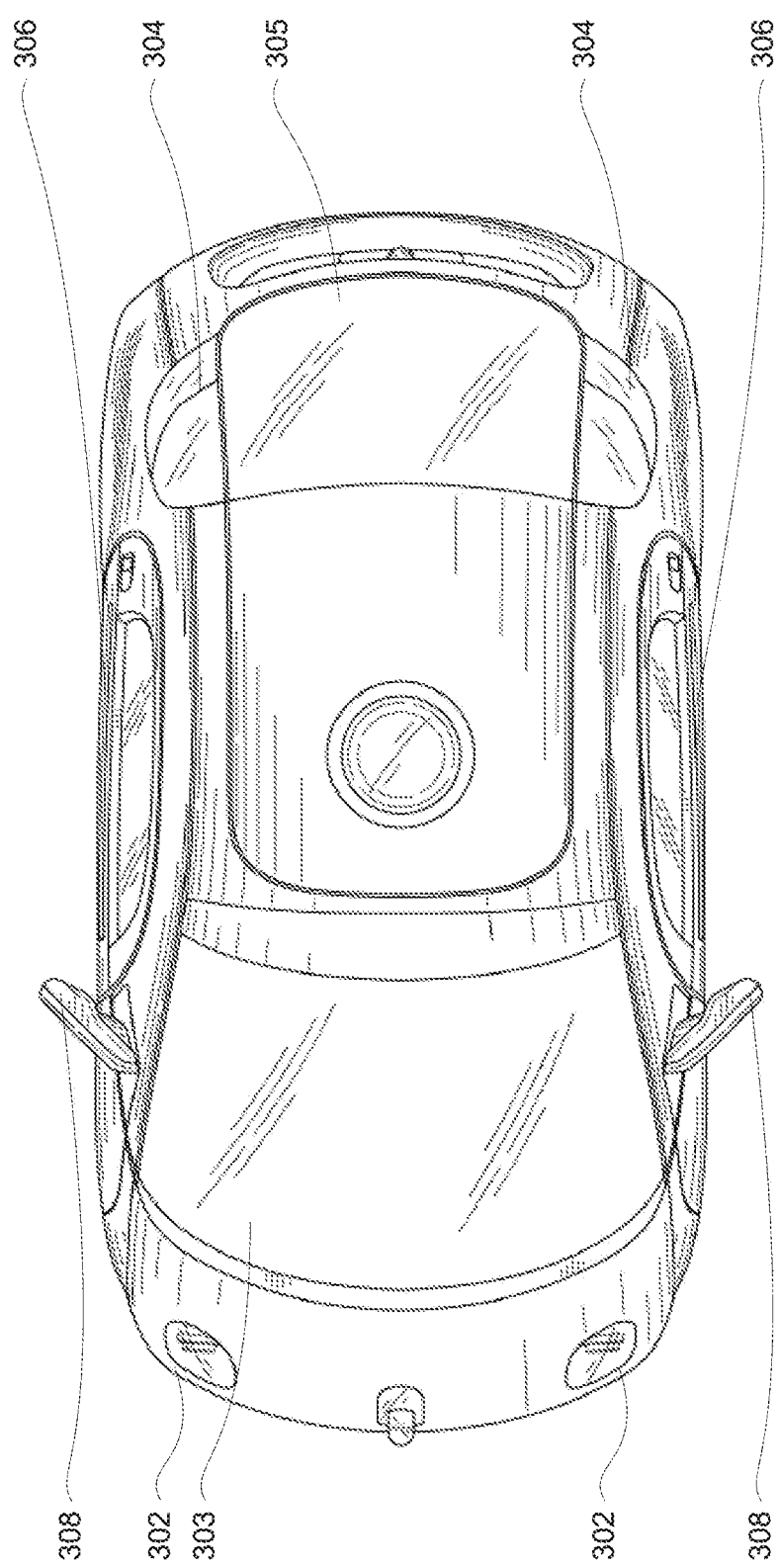

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record sensor data which may be processed by computing devices 110. The sensors of the perception system may detect objects and their characteristics such as location, orientation, size, shape, type (for instance, vehicle, person or pedestrian, bicyclist, etc.), heading, and speed of movement, etc. The raw data from the sensors and/or the aforementioned characteristics can be quantified or arranged into a descriptive function, vector, and or bounding box and sent as sensor data for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. Housing 314 may house one or more sensors, such as LIDAR sensors, sonar devices, radar units, cameras, etc. of the perception system 172, though such sensors may also be incorporated into other areas of the vehicle as well.

Data 134 may store one or more model for determining a likelihood value for how likely a person is to be directing traffic. As one example, the input to a model may include feature vectors listing values for states of any observations and contextual cues for a person. As an example, each feature would be a "I" to indicate a given observation or contextual cue or a "0" for each feature not observed. The output, may be a single likelihood value, for instance on a normalized scale of 0 to 1.

Each model may be generated by assigning each type of observation or contextual cue a weight indicative of how important that type is to the overall determination of whether a person is directing traffic. Similar concepts may be used to generate a model using machine learning. For instance, using prior observations of people by the perception system 172 and/or other sensor systems of other vehicles, feature vectors labeled for people directing traffic or feature vectors labeled for people who are not directing traffic may be used to train the model or rather to adjust the weights for each of the features.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Computing devices 110 may maneuver vehicle 100 to a destination location, for instance, to transport cargo and/or one or more passengers. In this regard, computing devices 110 may initiate the necessary systems to control the vehicle autonomously along a route to the destination location. For instance, the navigation system 168 may use the map information of data 134 to determine a path or route to the destination location that follows a set of connected rails of map information 200. The computing devices 110 may then maneuver the vehicle autonomously (or in an autonomous driving mode) as described above along the route towards the destination.

Figure 4:
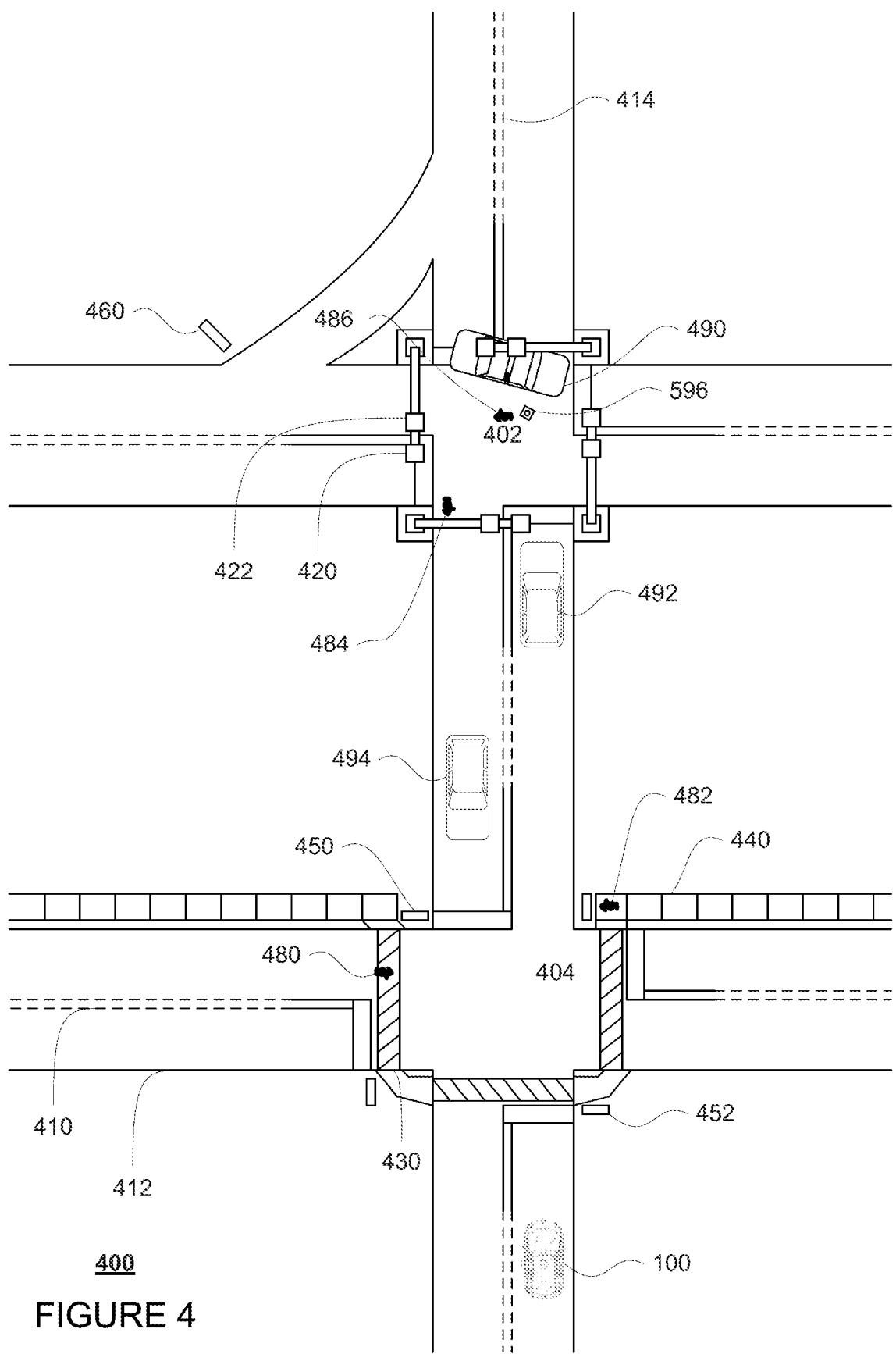
FIG. 4 is a view of a section of roadway in accordance with aspects of the disclosure.

For instance, FIG. 4 depicts vehicle 100 being maneuvered on a section of roadway 400 including intersections 402 and 404 corresponding to the map information 200. In this example, intersections 402 and 404 correspond to intersections 202 and 204 of the map information 200, respectively. In this example, lane lines 410, 412, and 414 correspond to the shape, location, and other characteristics of lane lines 210, 212, and 214, respectively. Similarly, crosswalk 430 corresponds to the shape, location, and other characteristics of crosswalk 230, respectively; sidewalks 440 correspond to sidewalks 240; traffic signal lights 420, 422 correspond to traffic signal lights 220, 222, respectively; stop signs 450, 452 correspond to stop signs 250, 252, respectively; and yield sign 460 corresponds to yield sign 260. In addition, various people 480-486, vehicles 490-494, and a parking cone 496 are arranged at different locations around roadway 400.

Figure 5:
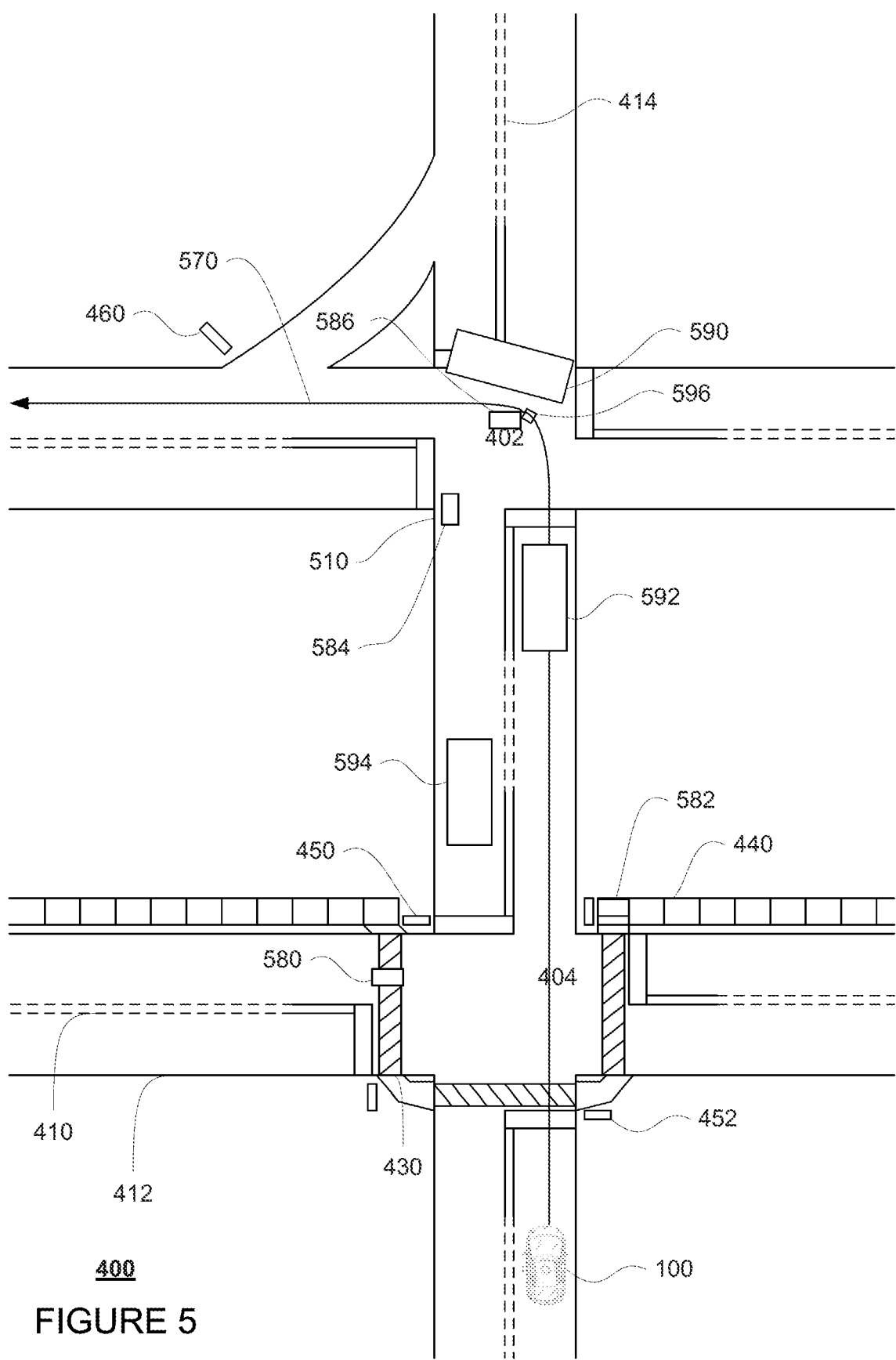
FIG. 5 is a view of a section of roadway and sensor data in accordance with aspects of the disclosure.

As the vehicle 100 moves through its environment, the vehicle's perception system 172 may provide the computing devices with sensor data including information about the vehicle's environment. As noted above, this sensor data may include the location, heading, speed, type and other characteristics such as the characteristics of features of the map information as well as other objects. For instance, FIG. 5 depicts features of the environment of vehicle 100 of FIG. 4 (traffic signal lights being removed for ease of understanding) with bounding boxes 580-586 and 590-596 representing the general shape and location of people 480-486, vehicles 490-494, and parking cone 496 as provided to the computing devices 110 by perception system 172. In this example, the navigation system 168 use map information 200 to determine a route 570 for vehicle 100 to follow in order to reach a destination (not shown), and the computing devices 110 may determine a trajectory for the vehicle to track over the next few seconds in order to follow the route.

At least some of these people may be relevant for further analysis to determine whether those people are directing traffic. For instance, a person such as a police officer, construction worker, firefighter, or other pedestrian may be temporarily directing the flow of traffic. As shown in FIG. 5, bounding boxes 580-586 may represent the set of people 480-486. Each of these people may be included in an initial set of people. This initial set is a critical step as it allows the vehicle's computing devices greater time and distance to observe the person's behavior or rather a longer time to observe the person's behavior.

In addition, from an initial set of all detected people, some people who the vehicle is not currently approaching or who are not actually located in a roadway may be filtered. For instance, person 482 (represented by bounding box 582) may be filtered from the initial set as person 482 is not located in a roadway, but rather is positioned on sidewalk 440. In some instances, person 482 may not be filtered, for instance, if it appears that person 482 is within some predetermined distance, such as 10 feet or more or less, of a sidewalk and/or roadway and appears to be moving towards entering the roadway. In such cases, there may be a small likelihood that person 482 may still be directing traffic, and thus the person 482 may be observed and its characteristics, etc. analyzed as discussed further below.

The sensor data from the perception system 172 may be used to make observations about any people remaining in the filtered set. These observations include anything that would indicate whether a person is more or less likely to be directing traffic such as whether the person is moving towards an edge of the roadway (i.e. is the person currently attempting to leave the roadway), whether the person is in a crosswalk, whether the person is about to leave a crosswalk (i.e. actual distance from an edge of the crosswalk or whether the person is within a predetermined distance from the edge of a crosswalk and heading towards the edge), whether the person is in an intersection, whether the person is about to leave an intersection (i.e. actual distance from an edge of an intersection or whether the person is within a predetermined distance from the edge of the intersection and heading towards the edge), etc. In some instances, if the information is provided by the perception system, whether the person is wearing a uniform (police, fire, construction gear, such as a reflective vest or jacket, or any other type of clothing typically worn by a person directing traffic) may also be considered.

In the example of FIG. 5, person 480 (represented by bounding box 582) is located within a crosswalk 430 (corresponding to crosswalk 230 of map information 200) and appears to be moving towards an edge of roadway 400. People 484 and 486 (represented by bounding boxes 584 and 586, respectively) are located within intersection 402 (corresponding to intersection 202 of map information 200) and neither is within a crosswalk. However, person 484 is very close to leaving the roadway at the edge 510 of intersection 402. In addition, person 486 may be wearing a uniform, for instance, a police uniform.

In addition to observing the people, the computing devices 110 may also make observations about the behavior of other vehicles in the proximity of the people from the sensor data. For example, for any vehicles detected by the perception system 172 within some distance, such as 50 feet or more or less, of the person, the computing devices may make observations about whether another vehicle is backing out of a driveway, whether another vehicle approaches the person and stops proximate to the person, etc. As another example, whether other vehicles behaving as though they are ignoring the normal traffic control, for instance, ignoring the traffic signal lights, going out of turn at a multi way stop, etc., may be an indication that such other vehicles may be obeying some other form of traffic control. For instance, the computing devices 110 may observe whether any of vehicles 490-494 are reacting to any of the people. In this example, vehicle 494 does not appear to be responding to any person, vehicle 492 appears to be stopping for person 486, and vehicle 490 appears to be stationary.

The computing devices 110 may also attempt to identify other contextual cues from the sensor data. For example, the computing devices may determine whether there is another vehicle stopped nearby the person or an intersection in which the person is located, whether that other vehicle is an emergency vehicle or special purpose vehicle (such as an ambulance, firetruck, tree-trimming truck, dump truck, garbage truck, patrol vehicle, police vehicle, etc.), whether there is any construction markers or equipment (including markers such as cones, barrels, sawhorses, etc.) within a predetermined distance (such as 10 feet or more or less) of the person, whether there are any construction signs within some short distance of the person, whether any traffic signal lights within a predetermined distance (such as 10 feet or more or less) of the person are off or flashing, etc. As an example, "nearby" a person or an intersection may refer to areas within the intersection as well as several feet, such as 25 feet or more or less, outside of the intersection.

In this regard, vehicle 490 may be identified as an emergency or police vehicle stopped within intersection 402 proximate to people 484 and 486, but closer to person 486 than person 484. In addition, person is standing proximate, for instance within 5 feet of parking cone 496 (represented by bounding box 596) Similarly, the traffic signals, such as traffic signals 420 and 422 (corresponding to traffic signals 220 and 222 of map information 200), of intersection 402, where people 484 and 486 are located, may be off or flashing.

Each of these observations and contextual cues may be input into a model of data 134 in order to determine a likelihood value for how likely a person is to be directing traffic. As noted above, this may include generating a feature vector for each person of the filtered set listing values for states of any observations and contextual cues for a given person. For instance, a feature vector may be generated for each person of the filtered set, including people 482, 484, and 486 given the observations and context cues discussed above.

The output of the model, as noted above, may be a single likelihood value, for each person of the filtered set. For instance, the likelihood value for person 486 may be relatively high, such as 0.9 or closer to 1, given the proximity of vehicle 490 (as an emergency vehicle) and parking cone 496 and the observations and contextual cues described above, whereas the likelihood value for person 482 may be much lower, or 0.1 or closer to 0 given the observations and contextual cues described above. Finally, the likelihood value for person 484 may be less than that of person 486, but greater than that of person 482, or 0.5, given the observations and contextual cues described above.

The likelihood values for each person of the filtered set may then be compared to a threshold value. If a likelihood value for a given meets the threshold value, the computing devices 110 may determine that that person is directing traffic. For instance, if the threshold value is 0.6, person 486 may be determined to be directing traffic at intersection 402. If the likelihood value does not meet the threshold value, the computing devices may continue to make observations and identify contextual cues and provide updated information to the model to determine if the person is directing traffic.

For instance, if the threshold value is 0.6, neither likelihood values for person 482 or 484 would meet the threshold, the computing devices 110 would continue to make observations and identify contextual cues with regard to these people and compare these to the threshold value so long as these people are not filtered from the initial set, the vehicle is no longer approaching these people (i.e. the vehicle has passed these people), or the person has not been observed for some period of time such as a few seconds or more or less (i.e. the person has entered a vehicle or a building, etc.). In that regard, the initial set, filtering, observations, and comparing to the threshold value may be done periodically such as one or more times per section.

At the same time, the computing devices may slow down if the likelihood is less than the threshold value, but still greater than a lower "intermediate" threshold value to allow the computing devices additional time to observe a person. For instance, if the intermediate threshold value is 0.4, then the computing devices 110 may slow down to increase the amount of data observed for person 484 as vehicle 100 approaches person 484.

The longer a person is observed, the more helpful the history of the person's position becomes in determining whether the person is directing traffic. This may continue until the vehicle has passed the person, the person is no longer in the roadway, the vehicle is no longer approaching the person, etc.

If a person is determined to be directing traffic as discussed above, the computing devices may use a separate gesture and command analysis system to determine how to identify commands relevant to the vehicle and how to respond to those commands. This may include requesting confirmation and classification of the people 'commands' from the gesture and command analysis system. Until a response to the request is received, the computing devices may prevent the vehicle from passing the person or approaching too closely. The computing devices may then control the vehicle according to the information received from the gesture and command analysis system.

Figure 6:
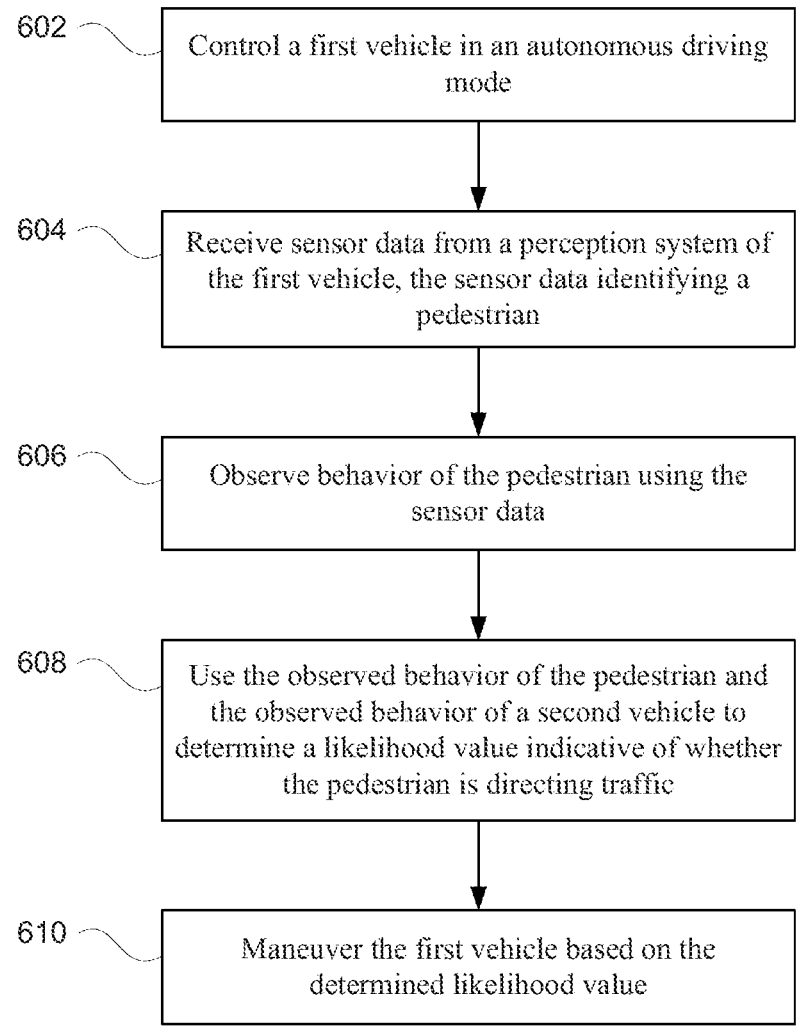
FIG. 6 is a flow diagram in accordance with aspects of the disclosure.

FIG. 6 is a flow diagram 600 that may be performed by one or more processors, such as one or more processors 120 of computing devices 110 in order to detect a person directing traffic. In this example, at block 602, a first vehicle is controlled in an autonomous driving mode. At block 604, sensor data is received from a perception system of the first vehicle, the sensor data identifying a person. At block 606, behavior of the person is observed using the sensor data. The observed behavior of the person and the observed behavior of a second vehicle are used to determine a likelihood value indicative of whether the person is directing traffic at block 608. The first vehicle is then maneuvered in the autonomous driving mode based on the determined likelihood value at block 610.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of detecting a person directing traffic, the method comprising:
   receiving, by one or more processors, sensor data from a perception system of a first vehicle, the sensor data identifying a person;
   observing, by the one or more processors, behavior of the person over time using the sensor data;
   determining, by the one or more processors, that the first vehicle is approaching the person;
   in response to the determining that the first vehicle is approaching the person, using, by the one or more processors, the observed behavior of the person to determine a likelihood value indicative of whether the person is directing traffic; and
   maneuvering, by the one or more processors, the first vehicle in an autonomous driving mode based on the determined likelihood value.

2. The method of claim 1, further comprising, determining a result indicating whether the determined likelihood value meets a threshold value, and wherein the maneuvering is further based on the determined likelihood value.

3. The method of claim 1, wherein observing the behavior of the person includes determining whether the person is within a roadway.

4. The method of claim 1, wherein observing the behavior of the person includes determining whether the person is moving towards an edge of a roadway.

5. The method of claim 1, wherein observing the behavior of the person includes determining whether the person is in a traffic intersection.

6. The method of claim 1, wherein observing the behavior of the person includes determining whether the person is wearing a uniform.

7. The method of claim 1, further comprising, observing behavior of a second vehicle, and wherein the determination of the likelihood value is further based on observed behavior of the second vehicle.

8. The method of claim 1, further comprising, identifying at least one contextual cue indicating contextual information of a scene around the person, and wherein the determination of the likelihood value is further based on the at least one contextual cue.

9. The method of claim 8, wherein the at least one contextual cue includes one of whether a second vehicle within the scene is an emergency vehicle, whether there are any construction signs within the scene, whether there are any construction markers within the scene, or whether there are any flashing traffic signal lights within the scene.

10. The method of claim 9, wherein the at least one contextual cue includes whether a particular type of object within the scene is within a predetermined distance of the person.

11. The method of claim 1, wherein the sensor data identifies a set of persons including the person, and wherein the determining that the first vehicle is approaching the person includes filtering the set of persons to remove any persons which the first vehicle is not approaching.

12. A system for detecting a person directing traffic, the system comprising one or more processors configured to control a first vehicle in an autonomous driving mode, the one or more processors being further configured to:
   receive sensor data from a perception system of the first vehicle, the sensor data identifying a person;
   observe behavior of the person over time using the sensor data;
   determine that the first vehicle is approaching the person;
   in response to the determination that the first vehicle is approaching the person, use the observed behavior of the person to determine a likelihood value indicative of whether the person is directing traffic; and
   maneuver the first vehicle in the autonomous driving mode based on the determined likelihood value.

13. The system of claim 12, wherein the one or more processors are further configured to determine a result indicating whether the determined likelihood value meets a threshold value, and wherein the maneuvering is further based on the determined likelihood value.

14. The system of claim 12, wherein the one or more processors are further configured to observe the behavior of the person by determining that the person is within a roadway.

15. The system of claim 12, wherein the one or more processors are further configured to observe behavior of a second vehicle with respect to the person, and to determine the likelihood value further based on the observed behavior of the second vehicle.

16. The system of claim 12, further comprising, identifying at least one contextual cue indicating contextual information of a scene around the person, and wherein the determination of the likelihood value is further based on the at least one contextual cue.

17. The system of claim 16, wherein the at least one contextual cue includes one of whether a second vehicle within the scene is an emergency vehicle, whether there are any construction signs within the scene, whether there are any construction markers within the scene, or whether there are any flashing traffic signal lights within the scene.

18. The system of claim 16, wherein the at least one contextual cue includes whether a particular type of object within the scene is within a predetermined distance of the person.

19. The system of claim 12, wherein the sensor data identifies a set of persons including the person, and wherein the one or more processors are further configured to determine that the first vehicle is approaching the person by filtering the set of persons to remove any persons which the vehicle is not approaching.

20. The system of claim 12, further comprising the first vehicle.

\* \* \* \* \*